C. T. PELTON.
TRANSPLANTER.
APPLICATION FILED MAR. 20, 1915.
1,169,674.
Patented Jan. 25, 1916.
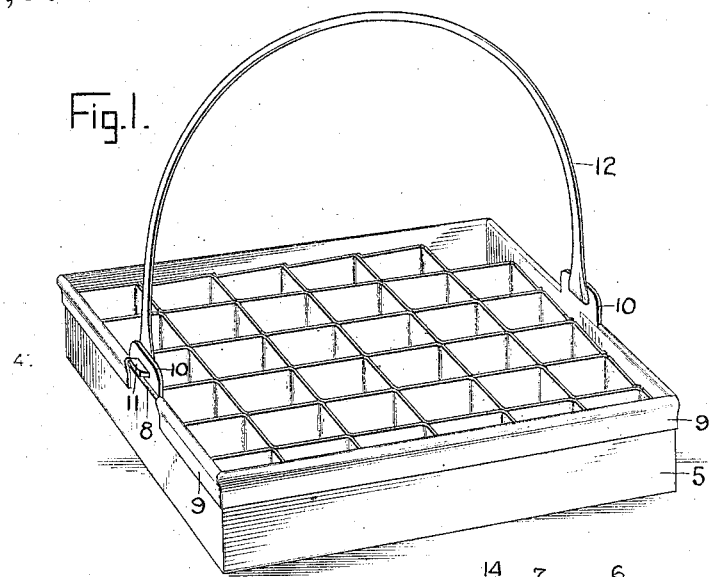
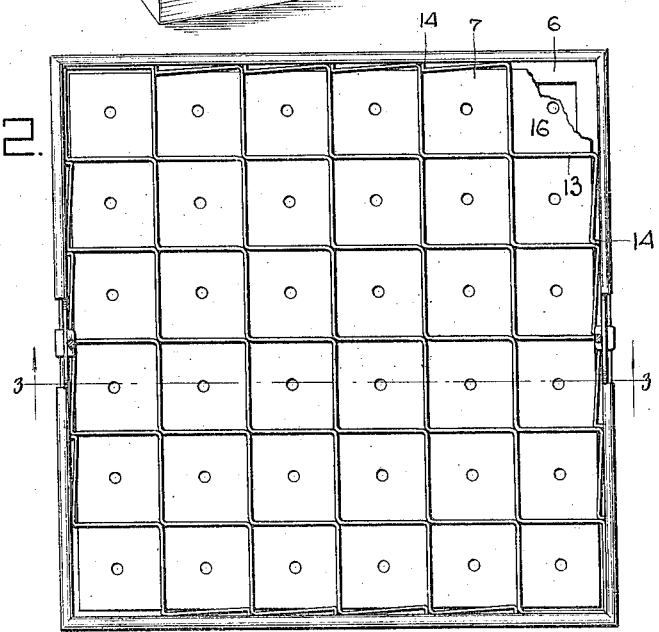
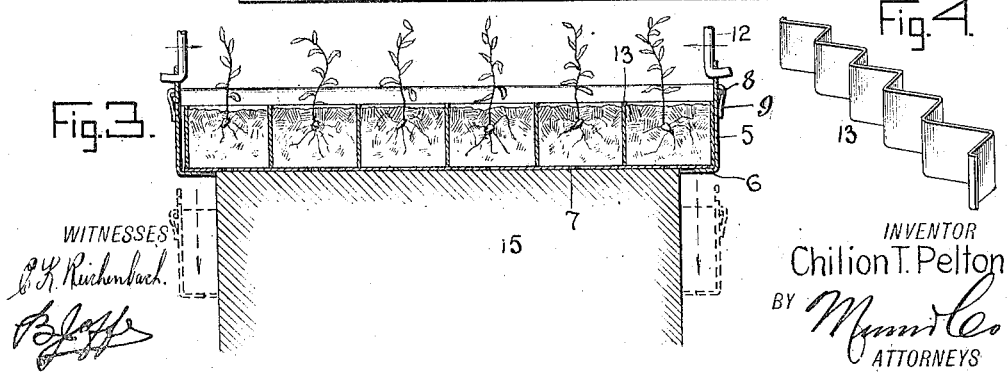
WITNESSES
INVENTOR
Chilion T. Pelton
BY
ATTORNEYS

UNITED STATES PATENT OFFICE.

CHILION T. PELTON, OF FALLON, NEVADA.

TRANSPLANTER.

1,169,674.  Specification of Letters Patent.  Patented Jan. 25, 1916.

Application filed March 20, 1915. Serial No. 15,941.

*To all whom it may concern:*

Be it known that I, CHILION T. PELTON, a citizen of the United States, and a resident of Fallon, in the county of Churchill and State of Nevada, have invented a new and Improved Transplanter, of which the following is a full, clear, and exact description.

My invention relates to plant boxes used for germinating and transplanting plants.

An object of the invention is to provide a simple, convenient, strong and inexpensive plant box, wherein a large number of seeds can be expeditiously planted and will be held during germination and after sprouting, without danger of the roots of the various plants becoming tangled.

A further object of the invention is to so dispose the seeds within the plant box that each of the germinated seeds can be easily and quickly removed without danger of injuring any of the other germinated seeds.

With this and other objects in view, the nature of which will more fully appear as the description proceeds, the invention consists in the novel construction, combination and arrangement of parts as herein fully described, illustrated and claimed.

In the accompanying drawings forming part of the specification, similar characters of reference indicate corresponding parts in all the views, and Figure 1 is a perspective view of my transplanter or plant box; Fig. 2 is a plan view thereof with the bail removed; Fig. 3 is a vertical sectional view on line 3—3 Fig. 2; and Fig. 4 is a perspective view of the filler.

Referring to the drawings, 5 represents a rectangular frame of any suitable material, preferably galvanized iron, the sides of the frame forming the sides of the box, the depth of which varies in accordance with seeds for which the box is designed. Each side, at one edge thereof, is provided with a marginal flange 6, and this constitutes the bottom of the frame. The marginal flanges form a support for a removable bottom 7.

The upper edge of each side of the frame is preferably reinforced by a wire member 8 engaged in the outwardly turned edge 9 of the sides. Two of the opposite sides of the frame are provided with alining ears 10, each having angular openings engaged by corresponding angularly shaped ends 11 of a removable bail 12. By making the ends angular, the box is prevented from tilting sidewise if one side is heavier. To remove the bail from the ears the ends of the bail are forced toward one another.

Disposed diagonally within the frame, and supported by the bottom 7, are removable fillers 13. The fillers 13 are preferably made out of strips of galvanized iron, and are substantially of the same width as the depth of the sides of the frame part. The strips are shaped into zig-zag form by bending portions thereof at right angles to each other, the length of the portions bent being substantially equal to the width of the strip, the alternate bent portions being parallel to each other and directed oppositely. The so shaped strips can then be cut up in desired lengths to form fillers, as shown. The ends of the fillers 13 are bent as shown at 14, to prevent the fillers contacting at the sides of the frame from wedging. The contacting fillers divide or partition the frame space into a plurality of rectangular receptacles which will accommodate the desired seeds to be planted. The bottom 7 is preferably perforated so as to allow suitable drainage.

When the fillers or partitions are all in place, the box is filled with soil into which the seeds or small plants are placed. When it is desired to transplant the germinated seeds from the box, the same is set on a square block 15 somewhat smaller than the rectangular aperture formed by the marginal flanges 6 (Fig. 3). As the bottom of the box is loose, the frame 5 can be forced down, leaving the loose bottom containing the fillers and the plants on the block. It will be noticed that on each of the two opposite corners a block of soil 16 contains a plant which can be at once removed to be transplanted by any suitable tool. When this block 16 is removed it will expose the first filler at the opposite corners where the blocks have been removed, which, when removed, will expose two blocks of soil which can then be removed, etc.

From the foregoing description, taken in connection with the accompanying drawings, the advantage of the construction and operation of the device shown will be readily understood by those skilled in the art to which the invention pertains; and while I have described the principle of operation, together with the device which I now consider to be the best embodiment thereof, I desire to have it understood that the device shown is merely illustrative and that such changes may be made as are within the scope of the appended claim.

Having thus described my invention, what I claim as new and desire to secure by Letters Patent, is:

In a device of the class described, a rectangular frame having inwardly directed marginal flanges at the lower edge thereof, a removable bail associated with the upper edge of the frame, a removable bottom adapted to rest on the marginal flanges within the frame, a plurality of separate and disconnected zig-zag shaped fillers each removably associated with the bottom and frame and disposed diagonally on said frame, said zig-zag shaped fillers forming with each other rectangular receptacles, each filler having projections at its ends for preventing them from wedging in the frame.

In testimony whereof I have signed my name to this specification in the presence of two subscribing witnesses.

CHILION T. PELTON.

Witnesses:
Mrs. T. A. Jones,
T. A. Jones.